United States Patent [19]
Hubbard et al.

[11] Patent Number: 4,835,768
[45] Date of Patent: May 30, 1989

[54] HIGH SPEED DIGITAL SIGNAL FRAMER-DEMULTIPLEXER

[75] Inventors: William M. Hubbard, Middletown; Dennis T. Kong, Holmdel, both of N.J.

[73] Assignee: Bell Communications Research, Inc., Livingston, N.J.

[21] Appl. No.: 181,560

[22] Filed: Apr. 14, 1988

[51] Int. Cl.⁴ ............................................. H04J 3/06
[52] U.S. Cl. ................................. 370/106; 375/116
[58] Field of Search ...................... 370/106, 105, 100; 375/114, 116

[56] References Cited

U.S. PATENT DOCUMENTS

| | | | |
|---|---|---|---|
| 3,597,547 | 8/1971 | Roll | 370/106 |
| 3,798,378 | 3/1974 | Epstein | 370/106 |
| 4,271,508 | 6/1981 | Schenk | 370/106 |
| 4,665,533 | 5/1987 | Tomikawa | 370/106 |
| 4,719,624 | 1/1988 | Bellisio | 370/100 |

Primary Examiner—Douglas W. Olms
Attorney, Agent, or Firm—James W. Falk; Lionel N. White

[57] ABSTRACT

A framer-demultiplexer circuit provides means for reducing the high serial bit-stream rate of byte-interleaved low level signal frame structures proposed by the Synchronous Optical Network (SONET) signal hierarchy to speeds which can be processed with low-power low-cost CMOS VLSI technology, while establishing and maintaining basic byte integrity. In this circuitry the incoming high-rate serial bit stream is divided alternately between shift registers 43, 44 under the control of a single high-precision clock-division circuit to provide a multi-bit formatting that enables parallel delivery of stage bytes with the multifold reduction in transmission to a rate within the processing capabilities of CMOs devices. Necessary synchronization of the register and latching elements of the circuit with the incoming bit stream is effected through use of comparator means 62, 64 which detect key bit patterns within the standard framing bytes for controlling the phases of the bit-distribution and byte out-latch clocks 41, 48. Additional comparator circuitry 34, 35, 36 employs framing byte sequences established during synchronous byte output to detect and signal the occurrence of frame structure benchmarks from which data-processing CMOS circuitry can determine the boundaries of data bytes within the parallel byte output from the demultiplexed frame. The phase-control bit sequence comparator circuitry 62, 64 is disabled during periods of satisfactory frame processing, but is reactivated upon the detection of framing sequence error to provide resynchronization in order to ensure recovery of properly restaged data bytes.

21 Claims, 5 Drawing Sheets

STS-N FRAME

BYTE STREAM

HIGH SPEED DIGITAL SIGNAL FRAMER-DEMULTIPLEXER

BACKGROUND OF THE INVENTION

The expansive data transmission capabilities of optical fiber technology have made practical the operation of digital telecommunication systems at rates well into the gigabit per second (Gbit/s) range. The advantages to be realized in this technology are apparent, and development of such systems has proceeded on numerous fronts worldwide. Unfortunately, these contemporaneous developments have resulted in a number of independently-devised signal architectures which lack the compatibility necessary for effective global, or even regional, communications networks.

With a view toward establishing and maintaining such compatibility, standards bodies have endorsed basic structures of optical system transmission rates and interfaces, not the least among which are those incorporated into the Synchronous Optical Network (SONET) hierarchy concept. This important advancement operates upon a base level digital signal framing format, namely the Synchronous Transport Signal level 1 (STS-1) frame, which consists of 810 8-bit bytes of data, and which therefore provides a serial bit transmission rate of 51.84 Mbit/s at the basic 8000 per second frame transmission rate.

Under this concept, signal transmissions of higher rate are achieved by interleaving bytes of any desired number of STS-1 frames in a prescribed sequence to form the correspondingly higher signal levels, e.g. STS-3, STS-4, STS-6, . . ., STS-24, etc. The STS-24 signal thus consists of the interleaved bytes of 24 STS-1 signals, and has a resulting transmission rate of 1244 Mbit/s, or 1.244 Gbit/s, i.e. 24 times the rate of the basic 51.84 Mbit/s of the STS-1 signal. For the transmission of such a signal, a multiplexed serial bit stream is assembled by interleaving repeated sequential extractions of one byte from each of the component STS-1 frames. It is necessary, therefore, that the signal receiver reconstruct from this serial bit stream the original base frame, or some frame multiple thereof, in order that the correct substance of the transmitted signal may be recovered.

While with current technology the serial bit stream may be assembled into fundamental 8-bit byte structures, it is essential to the proper recovery of the original SONET frames that the byte assembly be correctly synchronized and the boundaries of each such frame be identified in the bit stream transmission in order that the reconstructed bytes will duplicate each of the bytes which were interleaved to produce that serial transmission signal. The present invention provides method and apparatus to ensure that such proper synchronization and frame identification are established and maintained throughout such a signal transmission.

SUMMARY OF THE INVENTION

The basic SONET frame prescribed for the first transport level (STS-1) consists of nine rows of ninety 8-bit bytes each. Of these bytes, the first three in each row constitute the frame transport overhead containing framing, identification, error checking, and like information, while the remaining eighty-seven bytes make up the "payload" of the frame, i.e. the transport medium for the substance of the message or data transmission.

With a transmission rate of 51.84 Mbit/s, the STS-1 frame establishes the SONET frame period of 125 microseconds. This frame period is maintained throughout the hierarchy of increasing transport level frames by interleaving the respective bytes from each row of the component lower level frames, thereby deriving a transmission rate of $N \times 51.84$ Mbit/s for the STS-N frame. Utilizing available gallium arsenide (GaAs) enhancement-depletion mode metal semiconductor field effect transistor (MESFET) technology, integrated circuits for accomplishing such byte interleaf multiplexing have become practicable to the $N=24$ range of an STS-24 frame having a transmission rate of 1.244 Gbit/s.

Transmission of the STS-N frame is effected in a row-by-row manner, beginning with the first framing byte in the transport overhead and proceeding through the final $N \times 87$th payload byte of the first row before continuing on to the first overhead byte of the second frame row for transmission of each subsequent row of the frame in like manner. Following transmission of the last payload data byte of the ninth frame row at the end of the 125 microsecond frame period, the first framing byte of the next STS-N frame is transmitted, and the process continues in this manner throughout the transmission.

The bit stream of the transmission proceeds in the noted byte-interleaved succession at the rate, assuming the STS-24 frame, of 1.244 Gbits/s to the receiving station where that stream must be reformatted into the original bytes and frames in order for the receiver processing circuitry to properly extract the transmitted data and messages. Within this serial transmission of the data bit stream, however, there are no distinctly highlighted boundaries between the respective bytes and frames. It is necessary, therefore, that there be a capability in the receiving system by which these boundaries may be recognized so that synchronous byte structuring and frame formatting may be established.

The circuitry of the invention utilizes the two prescribed SONET framing byte bit patterns as bases for timing the initiation of byte structuring, as well as designating and confirming the boundaries of the frame format within such byte sequences. These framing bytes reside in the transport overhead and occupy the initial two positions in the STS-1 frame, or N-multiples thereof in a transmitted STS-N frame, and their respective unique bit patterns distinguish between them in all circumstances of bit pattern rotation.

During the demultiplexing of bits from the high-speed serial transmission of a frame, a characteristic bit pattern from one of the framing bytes is eventually recognized in comparator circuitry which signals the proper synchronization of byte formation and sets the clock controlling that operation. Other comparator means are provided which recognize the transition from the first to the second of the framing byte patterns to enable this occurrence to be utilized to denote the boundary between demultiplexed frames.

The present capabilities of GaAs enhancement-depletion mode and CMOS technologies are such as to provide maximum functionality of the former up to the STS-24 transmission rate of 1.244 Gbit/s, and of the latter at the 1:8 demultiplexed STS-3 rate of 155.5 Mbit/s. Although the reframing and demultiplexing of the high-speed serial data bit stream can be effected at the receiver in the GaAs MESFET circuitry, the requisite cost and power consumption make it desirable to reduce the signal transmission rate as soon as possible in the demultiplexing and signal processing operations in order to take advantage of the more economical low-power CMOS VLSI circuits. By limiting the operations of the high-speed GaAs circuits to the initial frame formatting and synchronization, and relegating to available CMOS chips the in-depth frame demultiplexing and signal processing, an effective and economical use is made of the capabilities of both these technologies.

In the general application of the present invention, the high-speed serial bit stream of the STS-N level, e.g. STS-24, transmission is demultiplexed to the basic SONET 8-bit byte-parallel format in the GaAs circuitry either at the STS-N clock rate or, preferably, at half that clock rate in order to provide a less restrictive time span for the implementation of the synchronizing gating functions. The resulting parallel byte stream is made available to companion CMOS circuitry for signal processing, while the high-speed GaAs chip, in addition to its byte-formatting function, is required only to recover framing synchronization. In the event of a loss of such frame synchronization, the CMOS processing circuit reinstitutes in the GaAs circuits the reframing process which normally will be accomplished within the period of two frames.

THE DRAWING

The present invention may be readily seen in the accompanying drawing of which:

DESCRIPTION OF THE INVENTION

Figure 1:
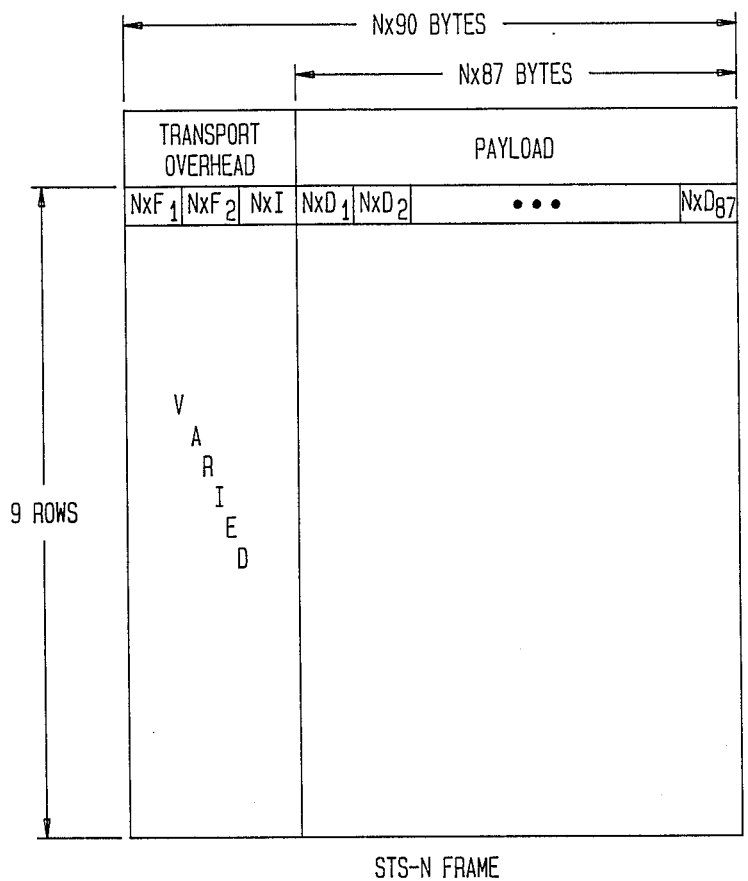
FIG. 1 is the representation of an N-level frame of the Synchronous Optical Network (SONET) signal hierarchy.

The Synchronous Optical Network (SONET) signal hierarchy is based upon the signal frame format generally represented in FIG. 1. The base, N=1 signal frame of STS-1 (Synchronous Transport Signal level 1) consists of the nine rows of ninety bytes in which the first two bytes of 8-bits are the SONET framing bytes, F1 and F2, having the prescribed bit patterns, 11110110 and 00101000, respectively. The third byte of the first frame row, designated generally as I, along with the remaining first three bytes in each of the remaining eight rows of the frame make up the balance of the transport overhead which provides frame identification, error checking information, message pointers, and the like.

The body of functional data, designated as the "payload", transmitted in each frame is located in the remaining 87 data bytes, D, in each of the nine frame rows to yield 783 bytes of such functional data. Each SONET frame is transmitted row-by-row at the rate of 8000 frames per second, thus producing, for the basic STS-1 signal, a serial bit stream of 51.84 Mbits/s. Successive levels of signal in the hierarchy are formed by interleaving the respective bytes of the basic STS-1 signals within the frame format to obtain the STS-N frame, where N=2, 3, 4, ... The basic 125 microsecond frame period is retained, however, thereby yielding increasing bit transmission rates to N×51.84 Mbits/s.

In each such frame, the similarly positioned bytes from each STS-1 signal are assembled sequentially in a string in the like position of that frame, thus locating a byte, B, from the ith position of the jth STS-1 frame at the Bij position in the STS-N frame. This SONET multiplexing arrangement may be seen from FIG. 2 in which there is depicted a representative serial transmission of the first row of an STS-N frame. The transmitted byte stream is headed by F1 framing bytes, F11, F12, ..., F1N, from each of the N interleaved STS-1 frames, followed by the F2 framing bytes, F21, F22, ..., and the remaining bytes of the row down to the final 87th data byte of the Nth STS-1 frame.

The following rows of the STS-N frame and subsequent such frames are similarly transmitted in the continuing serial bit stream to their destined terminating SONET receiver where the frames must be reformatted by reconstructing and demultiplexing the transmitted bytes in original order and sequence. It is necessary, however, in order to effect such byte and frame structuring that the beginning of each STS-N frame, as embedded in the serial transmission, be identified as such, and that byte formation be synchronized with that benchmark.

As noted, the serial transmission rate of the SONET frame is determined by the number of STS-1 signals multiplexed into the STS-N frame. It is, of course, desirable that this transmission rate be as great as possible in order to best exploit the extensive bandwidth available in today's fiber optic transmission facilities. At present, GaAs enhancement-depletion mode MESFET technology provides the capability of multiplexing/demultiplexing SONET frames up to the STS-24 signal level of 1.244 Gbits/s. However, in practice, the signal receiver requires complex circuitry to carry out the overhead processing and payload extraction on incoming signals. It is for this reason that it is desirable for the maximum amount of receiver processing to be accomplished in widely available lower speed, low-power CMOS VLSI circuits in order to avoid the substantial cost and power requirements of high-speed GaAs chip processing.

Figure 3:
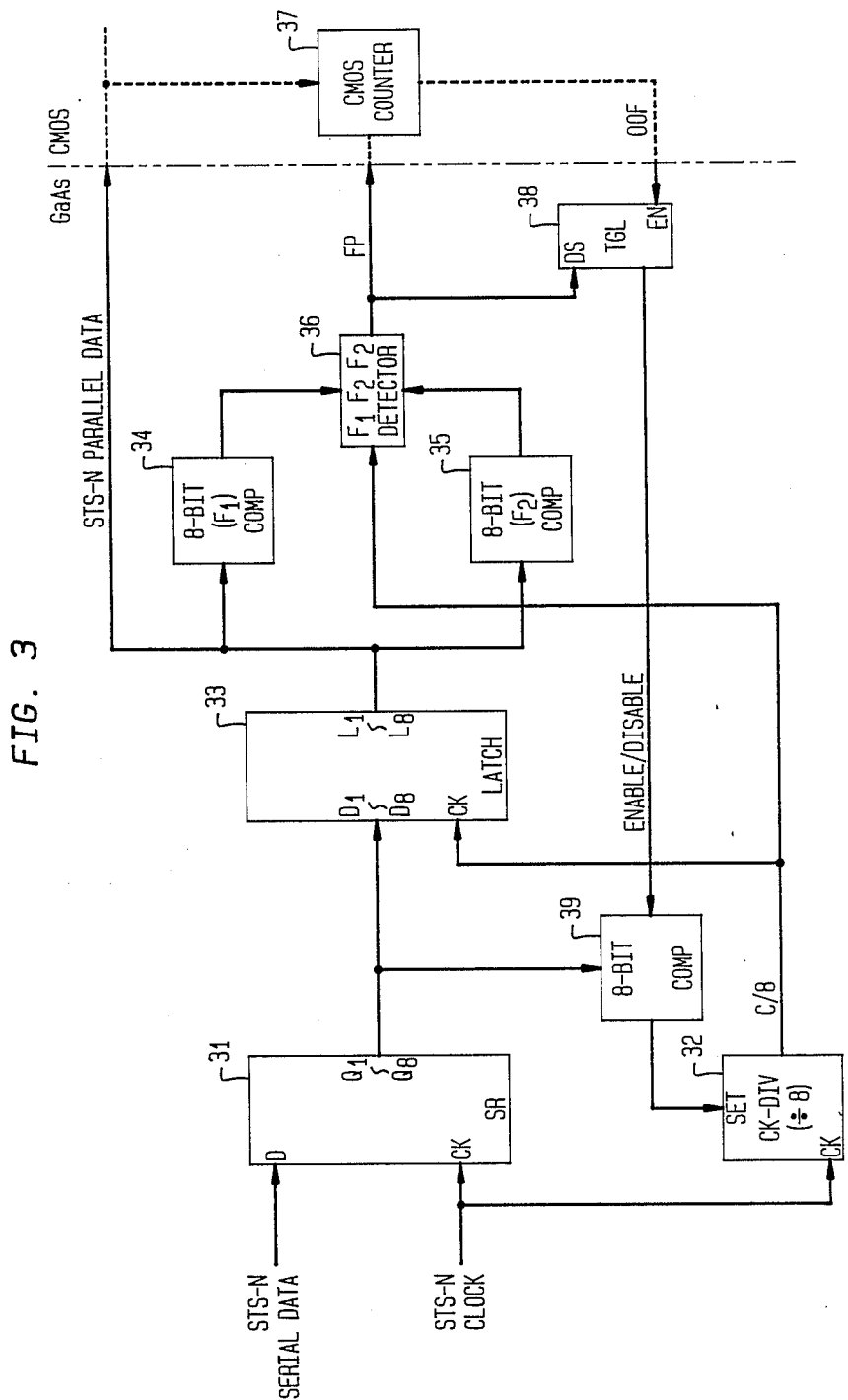
FIG. 3 is a block diagram of an embodiment of the framer-demultiplexer circuit of the present invention.

In accordance with the present invention, the byte formatting and frame definition are accomplished in a high-speed GaAs MESFET device receiver arrangement generally shown in FIG. 3. In this embodiment, the transmitted serial data bit stream of the STS-N signal, which for purposes of this description will be assumed to be at the STS-24 level, is input to an 8-bit shift register (SR) 31 where it is clocked through to the Q-outputs at the STS-24 rate of 1.244 Gbit/s. These outputs of SR 31 are connected in parallel to the inputs of 8-bit latch 33 from which the data will be appear as 8-bit bytes at outputs L1 ... L8. Although depicted here simply as separate devices, the shift register and latch may be combined in any known manner into a single device.

The STS-24 clock signal which is synchronized to the bit stream transmission, and which controls the sequencing of data bits through SR 31, is directed to clock divider 32 where it is reduced to one-eighth, C/8, of the STS-24 rate, i.e. to 155.5 Mbit/s. This C/8 clock signal output from divider 32, with usual appropriate timing and delay adjustments, is input to latch 33 to thereby trigger the output of each byte of 8-bits newly accumulated in SR 31. Without further control, however, the byte formatting at this point is subject to the arbitrary phase of the counter of divider 32. The correct sequence of bits in any byte output from latch 33 can therefore not be assured, since, depending upon the set of the divider counter, the bits of such byte may be distributed in any fashion between two consecutive latched-out bytes. The known sequence of the prescribed F1 framing byte, 11110110, may, for example, appear in any of eight such distributions, such as xxxxx111, 10110xxx, or xx111101, 10xxxxxx.

In order to set the byte-latching clock signal from divider 32 to the proper phase to ensure synchronization of byte formatting with the original bytes of the frame, comparator 39 is used to monitor the progressing states of the outputs of SR 31 as the incoming serial data stream containing the bits of the F1 framing byte are shifted through. The 8-bit comparator 39, which may be an OR gate configuration such as that of F1 comparator 34 shown in FIG. 7, or any equivalent combination of other types of gate elements, such as AND gates for example, is connected by means of individual input conductor leads to the appropriate Q and $\overline{Q}$ outputs of SR 31 in order that each such input will have a "0" state when SR 31 is loaded with the F1 framing byte, 11110110.

The "0" state output from comparator 39 will then set the counter of clock divider 32 to trigger the output of the matched F1 framing byte, and to begin clocking reconstructed, properly-phased 8-bit bytes out of latch 33 from that time on until some extraneous error occurs in the transmission. An enable/disable input to comparator 39, of which more will be described later, ensures that the resetting of clock divider 32 takes place only when its counter is out of synchronization with the F1 framing bytes.

Figure 2:
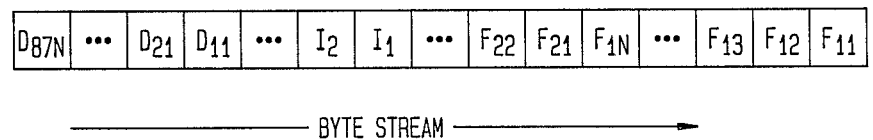
FIG. 2 is the representation of the transmitted byte stream format of the first row of a SONET N-level frame.

Upon completion of the formatting of the high-speed input serial data stream to a low-speed, properly synchronized byte-parallel data stream, there remains the problem of identifying the boundaries of each frame of the original transmission in order that the payload, as well as the relevant overhead information bytes, may be demultiplexed to the basic STS-1 level. For this purpose, the present invention relies upon the prescribed bit sequences of both the F1 and F2 framing bytes, of which each frame above STS-1 will have at least two, the F2 bytes following immediately upon the final F1 framing byte as depicted in FIG. 2.

This transition from the F1 to the F2 framing bytes repeats once each frame, N bytes after the beginning of the frame, and therefore serves as the benchmark from which may be determined the boundaries of the frame to be processed in the receiver circuitry. To recognize this transition, occurrence of the unique byte pattern sequence, F1F2F2, that is 11110110, 00101000, 00101000, is detected in the combination of 8-bit comparators 34, 35, and F1F2F2 detector 36, an embodiment of which is shown in greater detail in FIG. 7.

Figure 4:
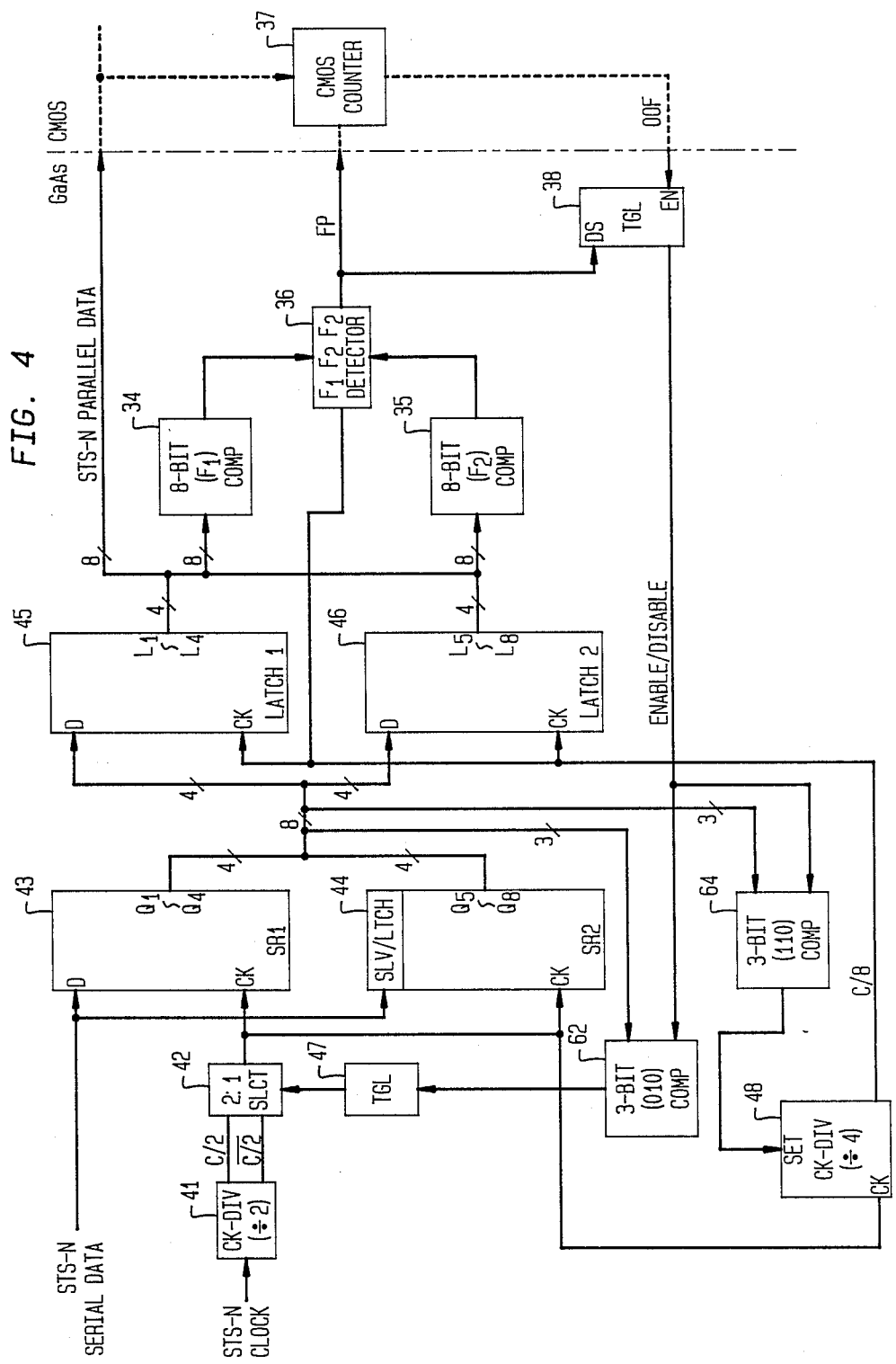
FIG. 4 is a block diagram of a preferred embodiment of the framer-demultiplexer circuit of the present invention.

As earlier noted, the inputs to the OR gate combination of F1 comparator 34 are attached to those respective L or $\overline{L}$ outputs of 8-bit latch 33, or of the two 4-bit latches 45, 46 used in the embodiment of FIG. 4, which will present "0" states to each of OR gates 71, 73 when an F1 framing byte, 1110110, is latched to the byte-parallel output line in synchrony with the C/8 clock signal from divider 32. The like "0" state outputs from gates 71, 73 will then carry through gate 72 as the output from F1 comparator 34. Passing sequentially through flip-flop (F/F) devices 75, 76, this "0" state output will appear at OR gate 79 two C/8 clock pulses later.

In similar manner, a following F2 framing byte, 00101000, will appear at comparator 35, which has the same device component structure, but different input lead arrangement, as comparator 34, one C/8 clock signal state change, or pulse, after the F1 byte appearance at comparator 34, and will provide a "0" state output to F/F 78. This state will appear at gate 79 one clock pulse later along with the second "0" state from comparator 35 signifying the occurrence of the second F2 byte in the F1F2F2 sequence. The three simultaneous "0" states thus appearing at gate 79 from comparator 35 and F/Fs 76 and 78 confirm detection of the unique F1F2F2 byte sequence by output of a framing pulse, FP, from detector 36.

This framing pulse, FP, will occur once in each synchronous frame of the byte-parallel transmission and is sent from the GaAs chip to a byte counter 37 associated with processing CMOS circuitry to reset that counter when the transmission remains "in frame". In the event of any error which causes loss of byte synchronization, F1 and F2 comparisons and F1F2F2 detection will fail, resulting in loss of the framing pulse, FP. After two frame cycles of such an "out-of-frame" condition, the CMOS byte counter 37 will have accumulated a preselected count and will overflow an out-of-frame pulse, OOF, which is directed back to toggle 38 in the GaAs circuitry to create an "enable" condition in comparator 39.

Thus activated, comparator 39 will initiate the reframing procedure with a search of SR 31 output conditions until the F1 framing byte appears. The phase of divider 32 is thereupon reset to establish, once again, correct frame synchronization. The first F1F2F2 sequence detected thereafter will generate an initial framing pulse, FP, which, in addition to resetting CMOS counter 37, will trip toggle 38 to disable comparator 39 and allow divider 32 to remain set at its present phase for as long as the transmission remains in frame.

The foregoing embodiment, although effective in its implementation, does exhibit somewhat less than optimal performance in that the initial operations for resetting the framing clock are carried out at the STS-N clock rate. Where, as in the current example, transmission is at the STS-24 signal level, these operations not only require the use of excessive power in the necessary high-speed devices, but they also establish a rather restricted clock-setting "window" which extends for only about 800 picoseconds. In order to effect an improvement in these areas, the split-register embodiment of the invention depicted in FIG. 4 is preferred over the single-register implementation of FIG. 3 in that it utilizes high-speed devices only in a simple free-running clock divider, and it expands the framing clock window to a more comfortable 1.6 nanoseconds.

As shown in FIG. 4, this preferred embodiment of the invention employs a high-speed clock divider 41 which need only reduce the STS-N, i.e. STS-24, clock rate of 1.244 Gbit/s to one-half that rate. Utilizing both the Q and $\overline{Q}$ outputs of divider 41, there are made available two 622 Mbit/s clock signals, C/2 and $\overline{C/2}$ that are in 180° phase opposition. One or the other of these clock signals may be put into use by means of 2:1 selector 42 which is set by toggle 47. This toggle is in turn controlled by 3-bit comparator 62 and activated when it is determined, as will later be described, that the byte formatting is out of frame and in need of the opposite phase of the C/2 clock. The selected clock signal is employed to load and shift the STS-24 signal serial data in paired bits into and through the two shift registers 43 and 44, and serves also as a basis for four-fold rate reduction in clock divider 48 to obtain the 155.5 Mbit/s byte clock signal.

Shift registers 43 (SR1) and 44 (SR2) are basically constructed of master/slave-type flip-flop devices which load input data on one phase, e.g. the rise, of the triggering clock, and latch that loaded data to the Q outputs on the opposite, i.e. falling, phase. Register 44, however, comprises as an additional first element a slave latch which operates, in this example, on the falling clock phase to trap a current bit for use as input to the following first stage of that register on the next rising load phase of the clock. In this manner, the trapped bit and the following bit in the serial transmission are loaded as a pair into the respective first stages of the SR2 and SR1 registers at each pulse of the C/2 clock, the SR2 bit lagging the SR1 bit due to the delay imparted by the trap latch element. Thus, although this clock signal is running at only half the rate of the serial data transmission, each STS-24 data bit is nonetheless clocked into the respective registers.

Figure 5:
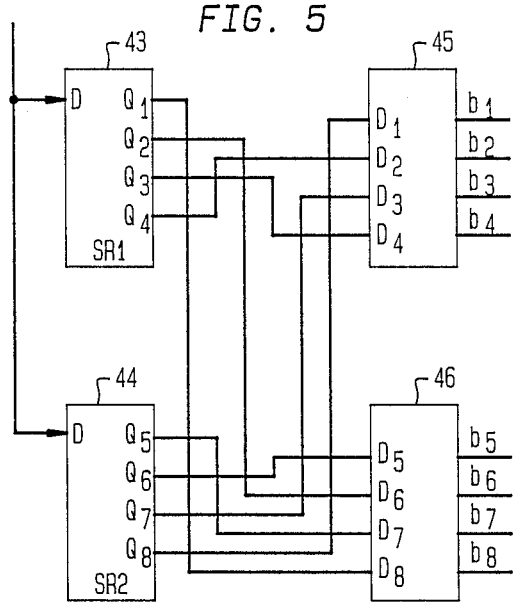
FIG. 5 is a block diagram of a shift register and latch arrangement utilized in the embodiment of the circuit of FIG. 4.

Latching out of the eight bits accumulated in registers 43, 44 is effected, as in the previous embodiment, upon a C/8 clock signal derived from the STS-24 clock of the incoming serial data stream. In this instance, this latching clock signal is obtained from a four-fold division, in clock divider 48, of the C/2 signal from selector 42. It should be understood here that although there are depicted a pair of 4-bit latches 45, 46 in use for this purpose a single 8-bit latch might be employed as in the single stage embodiment of FIG. 3. In any event, in order to obtain the correct sequence of bits at the latch outputs L1 ... L8, the arrangement of conductor leads between the Q1 ... Q8 outputs of registers 43, 44 and the inputs to latches 45, 46 is selected to be as shown in FIG. 5.

Since the first bits input to registers 43, 44 will have shifted to their respective Q4 and Q8 output positions during the accumulation of the remaining six bits of a given byte, the lead pattern between registers 43, 44 and latches 45, 46 appears as Q8-D1, Q4-D2, Q7-D3, ... This chosen arrangement will, of course, be valid for only one of the two possible opposed clock phases deriving from selector 42; however, as noted, the clock phase may readily be reversed to match the indicated connector arrangement. Upon each pulse of a properly-phased C/8 clock signal, then, the eight bits accumulated in registers 43, 44 in frame synchronization will be latched out to the byte-parallel output line in a correctly ordered, i.e. b1 ... b8, byte.

As previously indicated, the extra trap latch stage in register 44 imparts a one-bit delay in the loading of its first stage, thereby causing the SR2 bit to lag its companion SR1 bit during each clocked step in the register-loading process. As a result, the first bit of a given byte will, depending upon the phase of the C/2 clock, be loaded into SR1 register 43 or SR2 register 44. In the former event, the lagging SR2 bit will be the last bit of the previous byte, and the ultimately loaded byte will be out of byte synchronization. In the latter condition, the SR2 bit, i.e. the first bit of the loading byte, will lag the more recently arrived second bit of that byte which will be loaded simultaneously into the first stage of register 43 as the SR1 bit, thereby establishing the byte-synchronous condition wherein all bits of the given byte will reside in the registers at one time during the loading progression. Thus, in the present example, the byte-synchronous condition exists when the odd bits, i.e. the first, third, fifth, and seventh, of the given frame are trapped at SR2 register 44, and the even bits are loaded into SRI register 43.

Since the beginning of a framing procedure is subject to an arbitrary phase of the STS-N clock, and its dependent loading clock signal, C/2, one cannot be assured of the accumulation of bits in a byte-synchronous fashion, i.e. synchronized in accordance with the above-described loading preference upon which the noted conductor arrangement was chosen for transmitting staged bits to the byte-parallel output latch(es). There is thus a 50% chance that first bit of the 8-bit sequence of a given byte will be input to register 43 on the rising clock, rather than being, as desired, trapped at the slave latch of register 44 on the falling clock pulse. The clocking of bits in this out-of-phase manner will in effect retard the formatting of the byte by one bit and cause the latched-out byte to be out of phase, with the resultant loss of frame as well as all substantial meaning of the content of the transmission. The F1 framing byte, for instance, assuming a properly phased latching clock, C/8, would not appear in a fully-loaded register pair as its prescribed 11110110, but as an out-of-phase pattern, x1111011.

Upon analysis it will be seen, however, that during the progressive loading of registers 43, 44 under an out-of-phase clock signal a unique pattern of bits from an F1 framing byte will appear at the Q-outputs of those registers; specifically, the 010 pattern will appear at the Q7, Q2, Q1 outputs. The unique character of this pattern lies in the fact that it will not thus appear during any progressive loading of an in-phase sequence of any number, i.e. from any STS-N frame, of F1 and F2 framing bytes. The appearance of the 010 pattern may be relied upon, therefore, to signal the existence of an out-of-phase loading clock signal at the beginning of a framing procedure, since it will be encountered during receipt of the first F1 framing byte of the STS-N frame, and may be used to trigger a change in the output of selector 42 to the phase-opposed C/2 loading clock signal.

Figure 6:
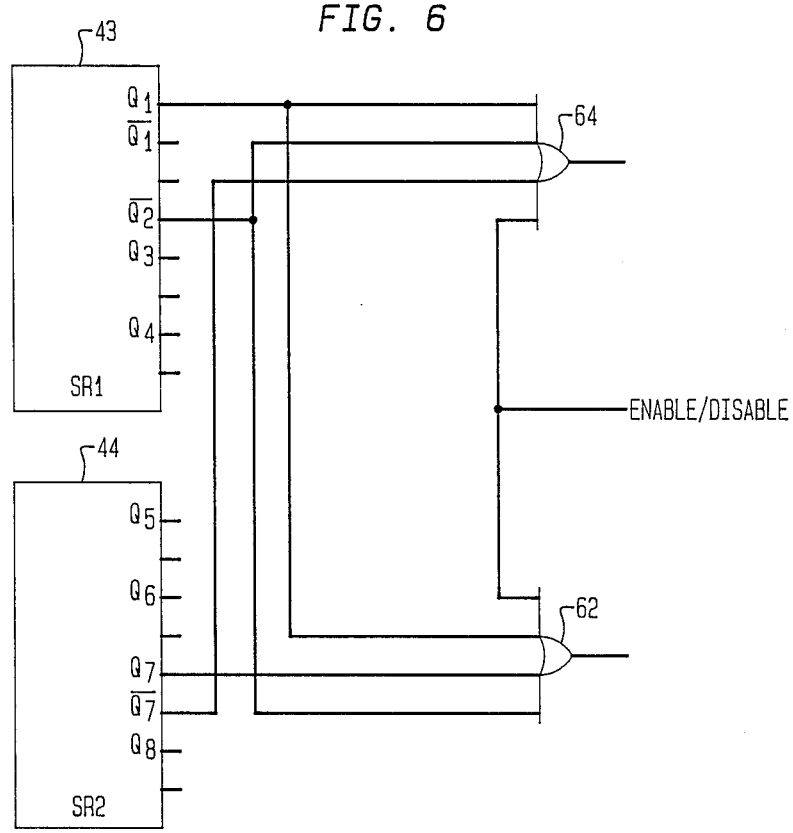
FIG. 6 is a block diagram of a shift register and 3-bit comparator arrangement utilized in the embodiment of the circuit of FIG. 4.

This phase-change operation is controlled in 3-bit (010) comparator 62, which is shown in FIG. 6 as being implemented in OR gate 62 to output a "0" state which will activate toggle 47 to effect the clock phase change in selector 42, as previously noted. To achieve the required 000 input to gate 62, the Q7, $\overline{Q2}$, Q1 outputs from registers 43, 44 are employed, along with the "0" input "enable" state from toggle 38 which, as will be recalled, is in that state as a result of a failure of the detection of the F1F2F2 frame sequence, i.e. the indication of the existence of some out-of-frame condition. As a matter of convention, the three bit leads are simply indicated in FIG. 4 by the character "/3", in the same manner as the respective leads for 4-bit and 8-bit data lines bear the notations, "/4" and "/8". Once the loading clock signal has been thus set to the proper phase, comparator 62 will not again see the occurrence of the 010 bit pattern in subsequent F1 and F2 framing bytes, and will be disabled at the F1F2F2 transition; thereby allowing the clock signal to remain in the selected phase even in the event that bits of an actual data byte match the 010 pattern. If, however, a transmission error occurs which disrupts the established framing, comparator 62 will be re-enabled by the resulting F1F2F2 failure at the beginning of the next frame, and will again initiate proper loading clock phasing at the start of the following frame.

With the loading clock signal, C/2, in the correct phase to ensure the loading of proper bytes from the STS-N frame, there remains the necessity to set the latching clock signal, C/8, to the correct phase to properly formatted bytes, rather than some intermediate rotation or progression in the bit accumulation. Once again, an analysis of the progressing in-phase bit patterns at the Q-outputs of registers 43, 44 reveals that there appears at the noted Q7, Q2, Q1 outputs the 110 bit pattern only when a complete F1 framing byte is fully-loaded and ready to be latched to the 8-bit byte-parallel output line. In the manner previously described with respect to comparator 62, a second 3-bit (110) comparator 64, more specifically shown in OR gate implementation in FIG. 6, employs the outputs from $\overline{Q7}$, $\overline{Q2}$ and Q1 to obtain, with the enabling state from toggle 38, to set the counter of clock divider 48 to trigger at this byte-synchronized stage for all subsequent framed bytes in the transmission. The disabling and re-enabling of comparator 64 is effected in the same manner as, and coincides with, that of comparator 62.

Figure 7:
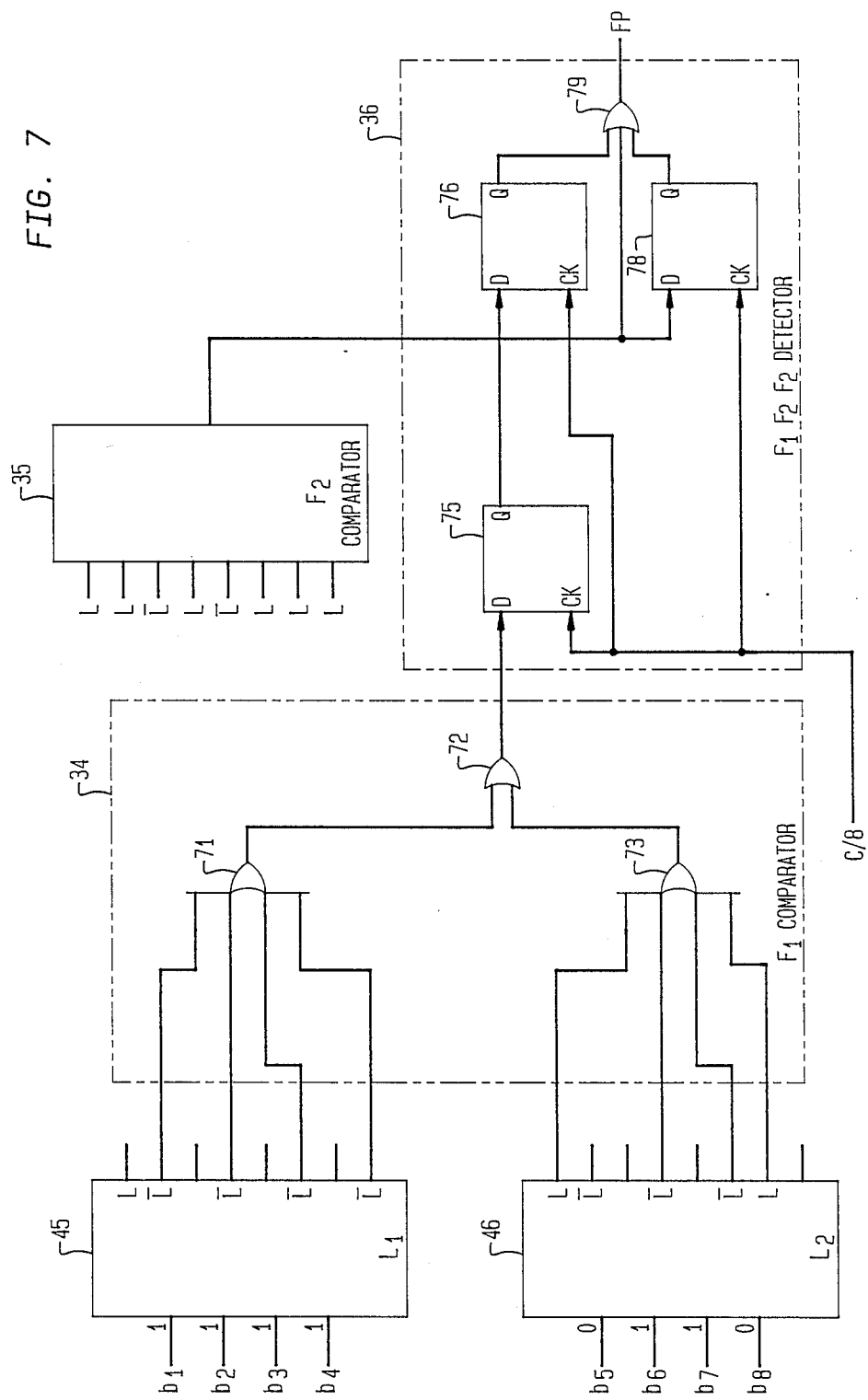
FIG. 7 is a block diagram of an 8-bit comparator and frame boundary detector arrangement utilized in the framer-demultiplexer circuit of the present invention.

After frame synchronization has been established in the foregoing manner for the preferred embodiment of FIG. 4, the procedure for frame boundary definition is carried out as previously described with respect to the single-register embodiment of FIG. 3, namely by passing the synchronous framing bytes on to 8-bit comparators 34, 35 to initiate the confirming framing pulse, FP, from F1F2F2 detector 36 during the subsequent in-frame condition. The enable/disable signal from toggle 38, which is conditioned by the framing pulse, is likewise employed similarly in both embodiments to activate the clock-phasing comparators. Although not specifically shown in the drawing, this signal may be used in comparator 39 in the same manner as that employed with 3-bit comparators 62, 64 (FIG. 6) to supply the additional control input state. For example, this control signal may be input to a final stage of 8-bit comparator 39, which could be similar to that shown as a gate 72 in comparator 34 (FIG. 7).

The present invention thus provides for the maximum utilization of available technologies for optimum economies of power and time in the demultiplexing of high-speed serial bit data transmissions to low-speed byte-parallel format within the Synchronous Optical Network (SONET) signal hierarchy. It is anticipated that other embodiments of the invention will be apparent from the foregoing description to those of ordinary skill in the art, and such embodiments are likewise to be considered within the scope of the invention as set out in the appended claims.

What is claimed is:

1. Apparatus for demultiplexing a serial data bit stream consisting of a continuum of an interleaved multiplicity of data bytes of predetermined size derived from a plurality of identically-formatted contributory frames each containing a plurality of said data bytes, and for reconstructing said data bytes and identifying from among them a benchmark from which may be determined the beginning byte of each of such contributory frames and, thereby, the boundaries of such frames, said apparatus comprising:

(a) means for accumulating data bits from said serial stream to form bytes having the same predetermined number of bits as do said interleaved data bytes;

(b) means for comparing at least one bit pattern from each byte thus formed with at least one bit pattern known to have comprised a byte of each of said contributory frames, and for providing a first signal when a match is detected between said compared patterns;

(c) means responsive to said first signal for effecting the output of the byte of matching bit pattern, and each byte thereafter formed of newly accumulated bits, as said reconstructed bytes;

(d) means for comparing bit patterns from a contiguous plurality of said output reconstructed bytes with bit patterns known to have comprised a like contiguous plurality of bytes of each of said contributory frames, and for providing a second signal as said benchmark identification when a match is detected between said compared patterns; and (e) means responsive to said second signal for controlling the operability of said means for providing said first signal.

2. Apparatus according to claim 1 wherein said data bit accumulating means comprises;

(a) shift register means providing a total number of stages equal to said predetermined number of bits; and (b) clock means providing a signal comprising states for loading said data bits into said register means and shifting said bits through said stages.

3. Apparatus according to claim 2 wherein said register means comprises a single shift register incorporating said total number of stages, and said clock means is arranged to provide said signal states at the rate of the transmission of said serial data bit stream.

4. Apparatus according to claim 2 wherein said register means comprises a plurality of shift registers of which each incorporates the same number of stages, and said clock means is arranged to provide said signal states at a rate which is obtained by dividing said bit stream transmission rate by the number equal to said plurality of shift registers.

5. Apparatus according to claim 4 wherein said register means comprises a pair of shift registers and means for presenting the individual data bits of consecutive bit pairs in said serial stream at the respective register inputs during the register-loading states of said clock signal.

6. Apparatus according to claim 5 wherein said means for presenting data bits comprises latch means associated with one of the registers of said pair for trapping and presenting at the input of said one register the individual data bits in said serial data stream which appear at said latch means during the states of said clock signal that are phase-opposed to said register-loading states.

7. Apparatus according to claim 6 wherein said clock means is arranged to selectively reverse the phase of said clock signal.

8. Apparatus according to claim 7 wherein said clock means is arranged to provide a pair of clock signals in phase opposition, and comprises means for selecting one of the clock signals of said pair.

9. Apparatus according to claim 7 which further comprises:

(a) means for comparing at least one bit pattern from each byte formed by the accumulation of data bits at the output of said shift register pair with at least one bit pattern known to appear in such a byte formed from a known contributory frame byte only during a given one of the available phases of said clock signal;

(b) means for providing a third signal when a match is detected between said compared patterns;

(c) means responsive to said third signal for effecting the selective reversal of said clock signal phase; and (d) means responsive to said second signal for controlling the operability of said means for providing said third signal.

10. Apparatus according to claim 1 wherein said bit pattern comparing and first signal providing means comprises gate means the inputs to which are derived from selected outputs of said bit accumulating means, which output selections are such, in location and signal state, as to input to said gate means a contributing activating state for each bit of said known bit pattern that appears at said outputs.

11. Apparatus according to claim 1 wherein said bit pattern comparing and second signal providing means comprises:

(a) a plurality of first gate means the inputs to which are derived from selected outputs of said reconstructed byte output means, which output selections are such, in location and signal state, as to input to respective ones of said first gate means a contributing activating state for each bit of said known bit patterns of respective ones of said contiguous contributory frame bytes that appears at said outputs;

(b) second gate means the inputs to which comprise the outputs from said first gate means; and (c) means for delaying the signals output from said respective first gate means so as to effect the simultaneous appearance of said output signals at said second gate means inputs, thereby effecting output of said second signal.

12. Apparatus according to claim 11 for demultiplexing a serial data bit stream derived from the format of contributory frames which comprises a pair of contiguous bytes of different, known bit patterns, thereby establishing in the output reconstructed bytes the contiguous plurality of bytes consisting of one byte having the first and the following two bytes having the second of said pair of bit patterns, wherein said first gate means comprises a pair of gate arrangements the respective inputs to which are derived from the outputs of said reconstructed byte output means which represent the bit patterns of said pair of contiguous bytes.

13. The method for demultiplexing a serial data bit stream consisting of a continuum of an interleaved multiplicity of data bytes of predetermined size derived from a plurality of identically-formatted contributory frames each containing a plurality of said data bytes, and for reconstructing said data bytes and identifying from among them a benchmark from which may be determined the beginning byte of each of such contributory frames and, thereby, the boundaries of such frames, said method comprising:

(a) accumulating data bits from said serial stream to form bytes having the same predetermined number of bits as do said interleaved data bytes;

(b) comparing at least one bit pattern from each byte thus formed with at least one bit pattern known to have comprised a byte of each of said contributory frames;

(c) providing a first signal when a match is detected between said compared patterns;

(d) effecting in response to said first signal the output of the byte of matching bit pattern, and each byte thereafter formed of newly accumulated bits, as said reconstructed bytes;

(e) comparing bit patterns from a contiguous plurality of said output reconstructed bytes with bit patterns known to have comprised a like contiguous plurality of bytes of each of said contributory frames;

(f) providing a second signal as said benchmark identification when a match is detected between said compared patterns; and (g) effecting in response to said second signal discontinuation of the provision of said first signal.

14. The method according to claim 13 wherein said data bit accumulating comprises;

(a) providing shift register means comprising a total number of stages equal to said predetermined number of bits; and (b) loading said data bits into said register means and shifting said bits through said stages in response to a given clock signal.

15. The method according to claim 14 wherein said data bits are loaded at the rate of transmission of said serial bit stream into a single shift register incorporation said total number of stages.

16. The method according to claim 14 wherein said data bits are loaded into a plurality of shift registers, of which each incorporates the same number of stages, at a rate which is obtained by dividing said bit stream transmission rate by the number equal to said plurality of shift registers.

17. The method according to claim 16 wherein said data bits are loaded into a pair of shift registers by presenting the individual data bits of consecutive bit pairs in said serial stream at the respective register inputs during the register-loading states of said clock signal.

18. The method according to claim 17 wherein said data bits are loaded into one of said pair of shift registers by trapping in latch means associated with said one register and presenting at the input of said one register the individual data bits in said serial data stream which appear at said latch means during the states of said clock signal that are phase-opposed to said register-loading states.

19. The method according to claim 18 which further comprises:

(a) comparing at least one bit pattern from each byte formed by the accumulation of data bits at the output of said shift register pair with at least one bit pattern known to appear in such a byte formed from a known contributory frame byte only during a given one of two opposed phases of said clock signal;

(b) providing a third signal when a match is detected between said compared patterns;

(c) effecting in responsive to said third signal the reversal of the phase of said clock signal; and (d) effecting in response to said second signal discontinuation of the provision of said third signal.

20. The method according to claim 13 wherein said comparing of bit patterns from a contiguous plurality of output reconstructed bytes, and said providing of said second signal comprises:
  (a) inputting to respective ones of a plurality of first gate means a contributing activating signal state for each bit in an output reconstructed byte that matches, in state and position, a bit in said known bit patterns of respective ones of said contiguous contributory frame bytes;
  (b) inputting to second gate means the outputs from said first gate means; and
  (c) delaying the signals output from said respective first gate means so as to effect the simultaneous appearance of said output signals at said second gate means inputs, thereby effecting output of said second signal.

21. The method according to claim 20 for demultiplexing a serial data bit stream derived from the format of contributory frames which comprises a pair of contiguous bytes of different, known bit patterns, thereby establishing in the output reconstructed bytes the contiguous plurality of bytes consisting of one byte having the first and the following two bytes having the second of said pair of bit patterns, wherein said inputting of signal states comprises inputting to each respective one of a pair of gate arrangements a contributing activating signal state for each bit in an output reconstructed byte that matches, in state and position, a bit in said known bit patterns of the respective ones of said pair of contiguous contributory frame bytes.

* * * * *